A. E. WOODHOUSE.
BENDABLE INCLOSING CASING.
APPLICATION FILED MAR. 7, 1910.
1,035,931.
Patented Aug. 20, 1912.
2 SHEETS—SHEET 1.
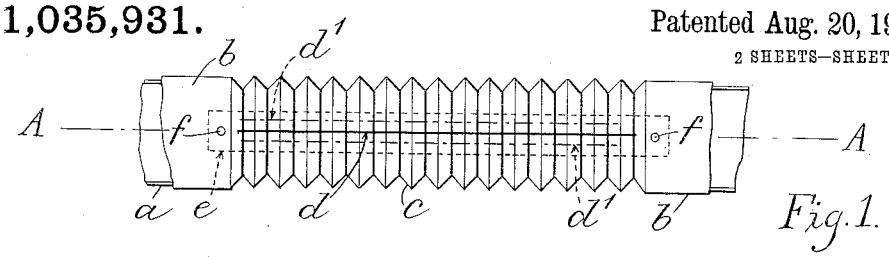
Fig. 1.
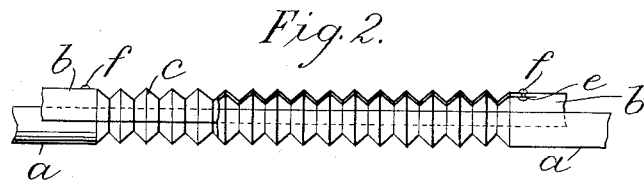
Fig. 2.
Fig. 3.
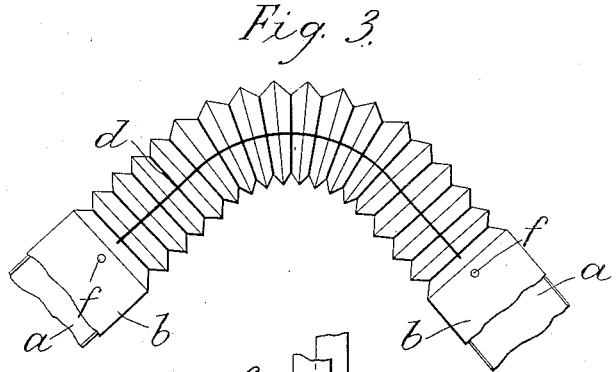
Fig. 4.
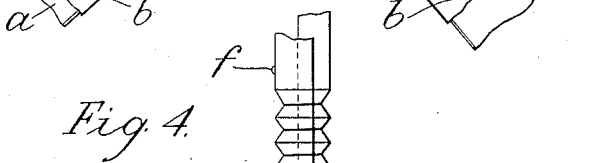
Fig. 5.
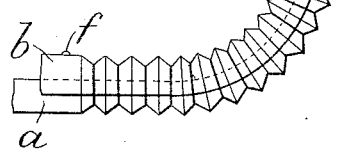
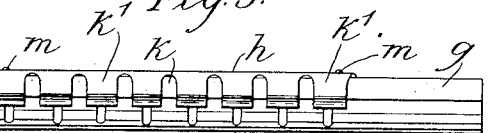
WITNESSES.
INVENTOR
Albert Ernest Woodhouse
By
ATTORNEYS.

A. E. WOODHOUSE.
BENDABLE INCLOSING CASING.
APPLICATION FILED MAR. 7, 1910.
1,035,931.
Patented Aug. 20, 1912.
2 SHEETS—SHEET 2.
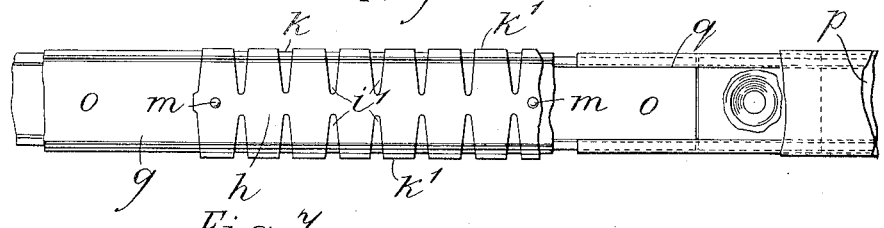
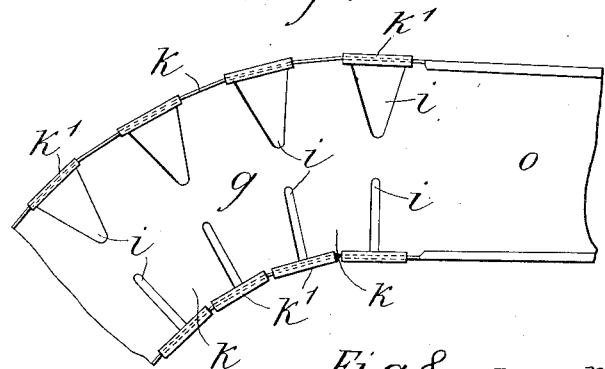
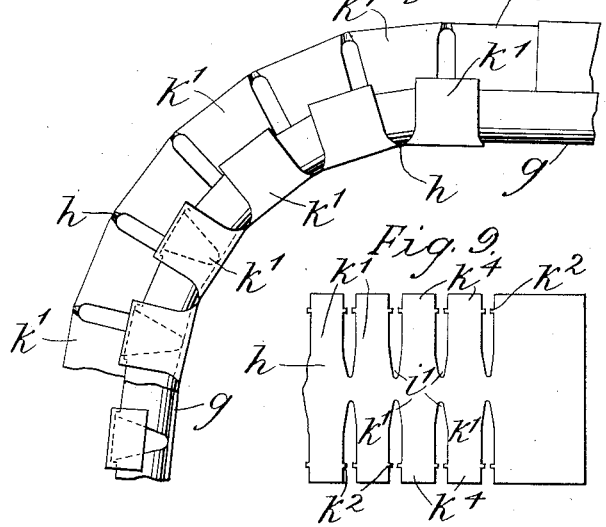
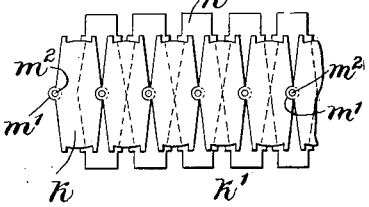
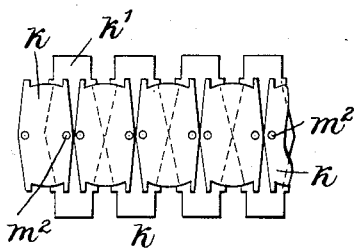
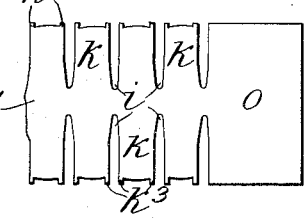
WITNESSES.
Edward M Jellinek
Irene Lefkowitz
INVENTOR
Albert Ernest Woodhouse
BY
Townsend & Decker
ATTORNEYS

UNITED STATES PATENT OFFICE.

ALBERT ERNEST WOODHOUSE, OF KINGSWAY, LONDON, ENGLAND.

BENDABLE INCLOSING CASING.

1,035,931.      Specification of Letters Patent.      Patented Aug. 20, 1912.

Application filed March 7, 1910. Serial No. 547,650.

*To all whom it may concern:*

Be it known that I, ALBERT ERNEST WOODHOUSE, a subject of the King of Great Britain and Ireland, residing at Kingsway, in the county of London, England, have invented a Bendable Inclosing Casing, of which the following is a specification.

This invention relates to inclosing casings, suitable for example for electrical wiring systems of the kind in which the casing with its cover for the conductors are connected and bonded in a manner such as is described in the specification of my British Letters Patent No. 6010 of 1906, and it has for its primary object to provide improved constructions of casing and cover that will enable sections thereof to be readily bent when required and connected up at curves and angles as may be found necessary, without resort to special mechanism during erection.

To render the casing bendable, the trough and cover comprising the casing can each be corrugated transversely, preferably with V shaped corrugations, the corrugations being made in the sides and across the bottom of the trough and in a similar manner across the cover. In some cases it is found advantageous not to carry the crests and hollows of the corrugations continuously around the trough or cover, but to arrange the crests and hollows on the sides in line with hollows and crests respectively on the bottom or top, as the case may be, in a similar manner to the method used in making camera bellows. Or the flexible casing may comprise two or more troughs fitting closely one inside the other, the covers being made in a similar manner, each trough being notched or slit at intervals down each side and nearly to the center by a series of notches or slits throughout its length with the exception of the end portions, and the troughs so fitted relatively to each other, that the notches or slits (hereinafter referred to as notches) of the inner trough are completely bridged over or covered by the tongues on the outer trough.

To attain the second object of the invention, a hollow box-like base or terminal fitting is formed with one or more apertures in which or each of which is fixed a joint clip or housing, into which and the aperture in the base or fitting, the end of a casing is forced, the cover of the end portion of the casing being also forced into the aperture, which is shaped to receive it, and over the joint clip or housing. The cover of the box-like base or fitting may conveniently be locked in position by any convenient means.

In the accompanying drawings, Figure 1 shows in plan and Fig. 2 partly in side elevation and partly in longitudinal vertical section on the line A A of Fig. 1, a corrugated form of trough with corrugated cover therefor, and Figs. 3 and 4 are views illustrating such a trough and cover bent in different directions, Fig. 3 showing the casing bent in its own plane and Fig. 5 showing it bent in a direction at right angles to that shown in Fig. 3. Fig. 5 shows in plan, and Fig. 6 in front elevation with part of the cover removed, a modified form of bendable trough and cover connected to a nonbendable section of casing. Fig. 7 represents part of the bendable trough of Fig. 5, to a larger scale, after it has been bent in its own plane. Fig. 8 is a view partly in section and also to a larger scale, of part of the trough and cover bent in a direction at right angles to the direction shown in Fig. 7. Figs. 9 and 10 are outlines of stampings used in the manufacture of the trough or cover shown in Figs. 5 to 8 inclusive. Figs. 11 and 12 are plan views showing modified constructions of trough or cover stampings. Fig. 13 is a cross section of the casing.

Referring to the example shown in Figs. 1 to 4, $a$ is the trough portion of the casing and $b$ the cover portion thereof adapted to be sprung over the trough portion, each portion being made of corrugated form with plain end portions. The corrugations $c$ are preferably of Λ shape, and are shown as normally extending transversely of the trough and cover. In order that the cover $b$ may be capable of widening out when used for sharp angles and bends, it is preferred to slit it down the center, as shown at $d$, and close the slit by a close fitting similarly corrugated strip $e$ secured to the inner side of the cover, preferably by rivets $f$ at each end of the cover. Sometimes two parallel non-continuous slits may be formed in the cover, as indicated in dotted lines at $d^1$, each slit in each line of slits being contiguous to the solid portions of the cover between the slits in the other line of slits. The said corrugated trough $a$ and cover $b$ can be separately or collectively bent by the hands to the curve or angle desired within limits, as indicated in Figs. 3 and 4, as the corrugations on the inside of the bend, being in compression, tend to close up, while the corrugations on the outside of the bend, being in tension, tend to open out. The corrugations on the other sides of the casing will be partly in tension and partly in compression and become radial as shown. The corrugations need not be exactly transverse to the length of the trough and cover, as shown, but may make a slight angle therewith. Sometimes it is preferred to anneal this corrugated troughing after manufacture to make it bend more easily.

The construction of bendable casing shown in Figs. 1 to 4 is suitable for use in damp places as well as for ordinary dry situations.

In the example according to Figs. 5 to 8, the bendable trough and cover are each formed of two stampings $g$ and $h$ of flat strip metal, as shown in Figs. 9 and 10, the stamping $g$ being notched at $i$ to form a series of tongues $k$ and the stamping $h$ being similarly notched at $i^1$ to form a series of tongues $k^1$ that are longer than the tongues $k$. The arrangement is such that the stampings can be superposed and bent into the trough shape shown in Figs. 5 to 8, and the outer end portions of the longer tongues $k^1$ on the outer stamping $h$ bent over the outer ends of the tongues $k$ of the inner stamping $g$ as shown. When two trough shaped stampings $g$ and $h$ only are used, the tongues $k^1$ at the opposite sides of the outer trough or stamping $h$ may be made with small projecting lugs $k^2$ one formed on each edge near the extremity. The outer extremities of the tongues $k$ on the inner trough or stamping $g$ extend to the region of the small lugs $k^2$ on the outer tongues $k^1$ where they are themselves provided with small extending lugs $k^3$ equal in length to the width of the lugs $k^2$ on the outer tongues $k^1$. The extremities $k^4$ of the outer tongues $k^1$ beyond the lugs $k^2$ are folded over the inner tongues $k$ sufficiently closely to permit of a close sliding fit between the inner and outer tongues. As shown, the lugs $k^2$ of each outer tongue $k^1$ of the stamping $h$ are arranged to project inwardly and embrace two adjoining corner lugs $k^3$ of two inner tongues $k$ of the stamping $g$. The effect of this construction is that the bending limit, in certain directions, is reached when the lugs $k^3$ and $k^2$ on the inner and outer tongues $k$ and $k^1$ come into contact, such contact preventing the trough being bent to such an angle as would cause a gap or gaps to appear in the sides between the tongues of the inner and outer troughs. If the compound trough is bent sidewise in the direction shown in Fig. 7, the bending limit is reached when the corners of the inner and outer tongues $k$ $k^1$ of the side in compression, come into contact. Similarly, when bending forwardly, as in Fig. 8, the bending limit is reached when the adjoining edges of the inner tongues and also the adjoining edges of the outer tongues, of the side in compression, come into contact and when the inner and outer lugs $k^3$ and $k^2$ of the side in tension come into contact. The outer edges of the tongues $k$ between the lugs $k^3$ are preferably made of convex shape as shown. Any convenient limiting means, other than the lugs $k^2$ $k^3$, may be provided on the tongues. The two stampings $g$ and $h$ composing each trough and cover may be secured together, at the longitudinal center line, by rivets $m$ (Fig. 6).

Sometimes the tongues $k$, $k^1$ forming the casing and cover may be formed of a number of separate pieces of sheet metal suitably shaped, assembled and jointed to form in effect flexible troughs arranged one inside the other. Fig. 11 shows one example of this kind wherein an inner set of pieces of sheet metal to form the tongues $k$ are formed with connecting lugs $m^1$ by means of which and pins $m^2$ they are jointed together and to an outer set of separate pieces of sheet metal to form the tongues $k^1$, the tongues in each set overlapping the gaps between the tongues in the other set, the tongues being then bent to the desired trough shape. The cover may be made in a similar manner.

Fig. 12 shows another example in which the inner pieces of sheet metal to form the tongues $k$ are jointed by pins $m^2$ to the outer pieces of sheet metal forming the tongues $k^1$ but not directly to each other.

Each form of casing is preferably made with plain end portions $o$ for bonding and fitting closely into jointing clips such as described in my said former British specification No. 6010 of 1906, but the methods of making the flexible or bendable casing herein described are not confined to any particular section of casing. In Fig. 6 the bendable section is shown connected to a non-bendable section $p$ by means of a spring clip $q$ of the said known kind, the cover of both sections being sprung over the clip in the manner described in the said former specification.

In some cases the adjacent surfaces of the superposed metal stampings $g$ and $h$ may be tinned so that after the casings have been bent into the required shape, the application of heat thereto will sweat the stampings together and render the casing rigid and, it may be, more damp proof.

Instead of bending the tongues of the outer trough over the tongues of the inner trough, as in the examples shown, the tongues of the inner trough may be lengthened and bent over those of the outer trough.

Sections of flexible casings and covers of the kind hereinbefore described can be used for connecting up at angles and bends, rigid casings and covers such as described in the said former British specification No. 6010 of 1906.

What I claim is:—

1. An inclosing casing of the character described, comprising a trough and a trough-like cover therefor, the said trough and cover, for the purpose of enabling the casing to be readily bent, being indented at the contiguous edges and sides.

2. An inclosing casing of the character described, comprising a trough having the edges and sides indented to permit such trough to expand readily at one side and to contract freely at the other side when bent, and a detachable trough-like cover similarly indented to expand at one side and contract at the other side when bent with the trough to which it is connected.

3. An inclosing casing of the character described, comprising a trough having the edges and sides indented to permit such trough to expand readily along its edges when bent, and a detachable trough-like cover similarly indented to contract along its edges when bent with the trough to which it is connected.

4. An inclosing casing of the character described, comprising a trough having the edges and sides indented to permit the trough to contract readily along its edges when bent and a detachable trough-like cover therefor similarly indented to expand along its edges when bent with the trough to which it is connected.

5. An inclosing casing of the character described, comprising stampings superposed to produce a trough having a transversely notched bottom containing a neutral axis and notched sides substantially perpendicular to the bottom that are adapted to expand or contract when the casing is bent in any direction.

6. An inclosing casing of the character described, comprising stampings superposed to produce a trough having a bottom containing a neutral axis and edges substantially perpendicular to the bottom that are adapted to expand or contract alternatively and means formed on said stampings adapted to limit the extent of the expansion or contraction of the trough edges.

7. An inclosing casing of the character described, comprising superposed stampings each having plain end portions and an intermediate transversely notched portion, the notches being arranged to permit contraction or expansion of the trough at the edges upon bending the latter in any direction.

8. An inclosing casing of the character described, comprising superposed stampings each notched transversely intermediate of its length and bent so as to form a trough having plain end portions, the superposition of the stampings being such that the material which constitutes tongues between the notches of one stamping masks the notches of an adjacent stamping.

9. In an inclosing casing of the character described, a trough comprising a stamping having notched edges, a second stamping of narrower width also having notched edges, one stamping being placed upon the other stamping so that the notches of both are staggered, and the notched edges of the wider stamping turned over the notched edges of the narrower stamping.

10. In an inclosing casing of the character described, a trough comprising a stamping having notched edges constituting tongues, lugs projecting laterally from the tongues intermediate of their length, a second stamping of narrower width having notched edges constituting shorter tongues, and lugs on the extremities of said shorter tongues, the narrower stamping being placed against the other stamping so that the tongues of one cover the notches between the tongues of the other, and the tongues and lugs of the wider stamping turned over the tongues and lugs of the narrower stamping.

Signed at London England this 21st day of February 1910.

ALBERT ERNEST WOODHOUSE.

Witnesses:
F. J. BINGHAM,
W. PRINGLE.